United States Patent
Kravanja et al.

(10) Patent No.: US 9,985,830 B2
(45) Date of Patent: May 29, 2018

(54) SYSTEM FOR MANAGING DATA RELATING TO THE USERS OF A HETEROGENEOUS COMMUNICATION SYSTEM INCLUDING A PLURALITY OF INTERCONNECTED COMMUNICATION DEVICES AND AT LEAST ONE CONFIGURATION SERVER

(71) Applicant: Kurmi Software, Cesson-Sevigne (FR)

(72) Inventors: Christian Kravanja, Paris (FR); Ludovic Pollet, Le Rheu (FR); Bruno Guirardel, Chantepie (FR)

(73) Assignee: KURMI SOFTWARE, Cesson-Sevigne (FR)

( * ) Notice: Subject to any disclaimer, the term of this patent is extended or adjusted under 35 U.S.C. 154(b) by 54 days.

(21) Appl. No.: 14/425,613

(22) PCT Filed: Sep. 3, 2013

(86) PCT No.: PCT/EP2013/068129
§ 371 (c)(1),
(2) Date: Mar. 3, 2015

(87) PCT Pub. No.: WO2014/033310
PCT Pub. Date: Mar. 6, 2014

(65) Prior Publication Data
US 2015/0256395 A1    Sep. 10, 2015

(30) Foreign Application Priority Data
Sep. 3, 2012 (FR) ..................................... 12 58177

(51) Int. Cl.
*G06F 15/16* (2006.01)
*H04L 12/24* (2006.01)
(Continued)

(52) U.S. Cl.
CPC .... *H04L 41/0816* (2013.01); *G06F 17/30864* (2013.01); *H04L 12/283* (2013.01);
(Continued)

(58) Field of Classification Search
USPC .......................................... 709/217
See application file for complete search history.

(56) References Cited

U.S. PATENT DOCUMENTS 5,794,252 A * 8/1998 Bailey ..................... B65H 1/06
                                                    707/610
6,044,465 A * 3/2000 Dutcher .................. G06F 21/33
                                                    726/13
(Continued)

FOREIGN PATENT DOCUMENTS

EP        1 241 828 A1    9/2002
WO     WO 00/76228 A1    12/2000

OTHER PUBLICATIONS

International Search Report in PCT/EP2013/068129 dated Oct. 28, 2013, with English translation coversheet. 4 pages.
(Continued)

*Primary Examiner* — Alicia Baturay
(74) *Attorney, Agent, or Firm* — Womble Bond Dickinson (US) LLP

(57) ABSTRACT

The present invention relates to a system (1) for managing data relating to the users of a communication system, including a plurality of interconnected communication devices (2) and at least one configuration server (3). The system includes a homogenization server (4) connected to each configuration server (3), the homogenization server (4) including a storage means (41) which stores a database that includes all the data relating to the users of the devices associated with the configuration servers (3) in a homogenized format, the homogenization server (4) including a data-processing means configured such as to update the
(Continued)

database thereof in accordance with every modification of the database of a configuration server (3) and to update the database of at least one configuration server (3) in accordance with any modification of the database of the homogenization server (4).

11 Claims, 1 Drawing Sheet

(51) Int. Cl.
  *H04L 29/08* (2006.01)
  *H04L 12/28* (2006.01)
  *G06F 17/30* (2006.01)
(52) U.S. Cl.
  CPC .......... *H04L 41/00* (2013.01); *H04L 67/2823* (2013.01); *H04L 67/306* (2013.01)

(56) References Cited

U.S. PATENT DOCUMENTS

| | | | | |
|---|---|---|---|---|
| 6,061,740 A | * | 5/2000 | Ferguson | G06F 21/6218 709/201 |
| 6,065,054 A | * | 5/2000 | Dutcher | G06F 9/468 709/203 |
| 6,209,032 B1 | * | 3/2001 | Dutcher | H04L 67/1095 709/208 |
| 6,216,162 B1 | * | 4/2001 | Dutcher | H04L 29/06 709/223 |
| 6,269,405 B1 | * | 7/2001 | Dutcher | G06F 21/41 707/999.201 |
| 6,269,406 B1 | * | 7/2001 | Dutcher | G06F 21/41 707/999.201 |
| 6,311,205 B1 | * | 10/2001 | Dutcher | H04L 63/08 707/999.01 |
| 6,442,695 B1 | * | 8/2002 | Dutcher | G06F 17/30067 707/E17.01 |
| 6,748,436 B1 | * | 6/2004 | Anand | H04L 41/0226 709/223 |
| 7,760,767 B2 | * | 7/2010 | Nilo | H04L 67/104 370/400 |
| 2006/0235904 A1 | * | 10/2006 | Kapur | G06F 11/2097 |
| 2007/0179963 A1 | * | 8/2007 | Fujiyama | G06F 11/2064 |

OTHER PUBLICATIONS

Search Report in French Application No. 1258177 dated Mar. 20, 2013, with English translation coversheet. 3 pages.

* cited by examiner

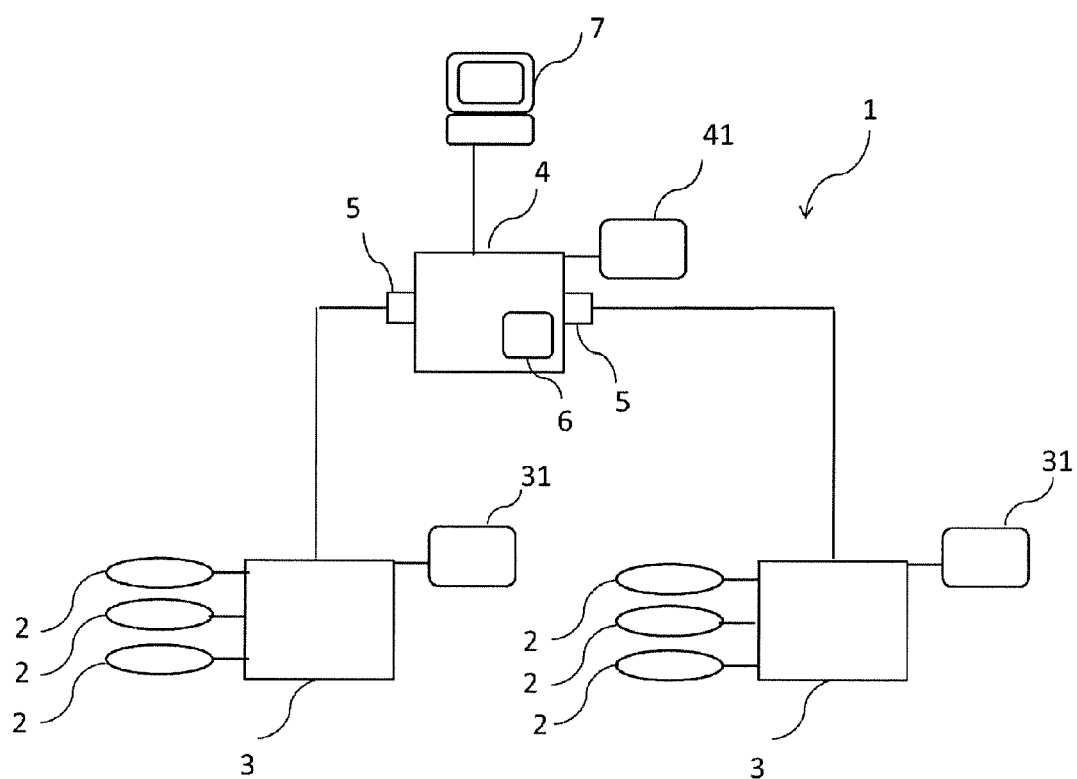

SYSTEM FOR MANAGING DATA RELATING TO THE USERS OF A HETEROGENEOUS COMMUNICATION SYSTEM INCLUDING A PLURALITY OF INTERCONNECTED COMMUNICATION DEVICES AND AT LEAST ONE CONFIGURATION SERVER

FIELD OF THE INVENTION

The present invention relates to systems for managing data relating to the users of a communication system.

More particularly, the present invention relates to a system for managing the users of a communication system in a heterogeneous network environment.

STATE OF THE PRIOR ART

Modern communication systems make it possible to incorporate interpersonal communications means within a company. These systems allow the user to carry out numerous operations from his desktop computer or his portable computer such as managing his contacts and his agenda, communicating by email, knowing the presence status of a colleague, initiating a vocal or videoconference communication, managing his reachability at a single call number, scheduling meetings, checking the availability of guests, following up responses to invitations, chairing and participating in an audio or video meeting, publishing and modifying a document in real time, consulting his vocal messages, faxes received or instead transferring rapidly and securely a document.

Numerous suppliers of communications services (referred to as "unified") exist each proposing different communication environments. A cohabitation within a same company of different non-compatible communication environments is commonly observed. The resulting communication systems are often heterogeneous, and buy-outs, mergers or reorganisations of companies are factors that accentuate this trend.

It is in fact quite common that each site of a company has a specific communications architecture.

This heterogeneity of communication systems within a company considerably complicates the access of users to the company's communication network.

For example when a user moves to a site using a communication system different to that used on his original site, it is necessary to create for him a new profile user in this communication system. Such an operation is laborious and requires the intervention of an expert.

In a "heterogeneous" configuration which includes at least two "homogeneous" subsets incompatible with each other the user data cannot be managed in an overall manner. When a modification is made to the user data on a given site, this modification has to be transferred manually onto all the other sites of the company.

To overcome this problem, different solutions have already been proposed. The patent U.S. Pat. No. 6,748,436, for example, proposes a method implementing a translation server. The administrator sends to the translation server instructions for modifying user data. The translation server determines the configuration servers concerned and carries out a conversion to the data model of these servers.

This method provides satisfaction, but it remains necessary to take account of all the databases to manage the profiles exhaustively.

DESCRIPTION OF THE INVENTION

The invention proposes a homogenised system for managing data relating to the users of a heterogeneous communication network, which allows users a better flexibility in the whole communication network of a company.

It proposes in particular a system for managing data relating to the users of a communication system, said communication system including a plurality of interconnected communication devices and at least one configuration server, each configuration server being associated with a compatible subset of said plurality of communication devices, at least two subsets being such that the configuration server on one is incompatible with devices associated with the configuration server of the other, and each configuration server including a storage means which stores a database relating to the users of the devices associated with said configuration server.

This system further includes a homogenisation server connected to each configuration server, the homogenisation server including a storage means which stores a database including all the data relating to the users of devices associated with the configuration servers in a homogenised format, the homogenisation server including data processing means configured such as to update the database thereof in accordance with every modification of the database of a configuration server and to update the database of at least one configuration server in accordance with every modification of the database of the homogenisation server.

Such a system makes it possible to further facilitate homogenised management by using a server (referred to as "homogenisation" server) comprising its own persistent database storing all of the data relating to the users of the devices associated with the configuration servers. In other words, in the proposed system, all the data relating to users are present in duplicate: once in the database of one of the configuration servers, and once in the database of this new server.

Thanks to this system, it becomes easy, including for a non-expert user, to create, manage, transfer and configure user profiles in a heterogeneous environment.

Such a system may be completed by the following different characteristics taken alone or in combination

- the homogenisation server comprises, for each of the configuration servers, a connector assuring the conversion of data stored by the homogenisation server in the data format of the database of the configuration server and/or the conversion of data stored by the configuration server in the data format of the database of the homogenisation server;
- the homogenisation server comprises, moreover, a component able to generate, from data relating to a user stored in the different databases of the different configuration servers, at least one homogenised user profile,
- the system comprises at least one computer device connected to the homogenisation server for the implementation of an interface allowing a user to carry out modifications to the data stored on the homogenisation server.

The invention further proposes a method for updating data relating to a user of a communication system including a plurality of interconnected communication devices and at least one configuration server.

It also proposes a homogenisation server.

DESCRIPTION OF THE FIGURES

Other characteristics, aims and advantages of the present invention will become clearer on reading the detailed description that follows, given by way of non-limiting example and made with reference to the single appended FIGURE, which is a schematic representation of the system for managing data relating to the users of a communication system according to a possible embodiment for the invention.

DETAILED DESCRIPTION OF THE INVENTION

The communication system of FIG. 1 includes a plurality of interconnected communication devices 2 such as landline and mobile telephone devices, video teleconferencing devices, computer devices such as work stations implementing collaborative working tools (such as instantaneous messaging, presence, web conferencing systems, sharing and managing documents . . . ) and office automation tools, such as the client of electronic messaging, agenda, word processing or presentation viewing software.

These communication devices 2 are grouped together into compatible subsets, that is configured in accordance with a same logic. With each of these subsets is associated a configuration server 3.

These configuration servers 3 include a storage means 31 which stores a database relating to the users of the devices that are associated therewith.

These different configuration servers 3 store databases organised in accordance with a data model that is specific to them. These different data models are thus generally not compatible with each other.

In fact, each make of configuration server 3 (Cisco, Avaya, etc.) has its database having a specific structure (conceived by the manufacturer of the server 3) and responding to commands in a particular syntax. It is common that two servers 3 of competitive makes have a large number of common parameters (name, extension number, identifier, equipment, email address, etc.), but certain parameters are not found in each.

In the present system, at least two subsets are thus such that the configuration server 3 of one is incompatible with devices 2 associated with the configuration server 3 of the other, in other words, at least one heterogeneity is found. It will nevertheless be understood that it is entirely possible that the system furthermore includes several subsets which are for their part compatible, providing that there is at least one heterogeneity. As an example, a system may include three configuration servers 3 of which two of Cisco make and one of Avaya make: the subsets of devices 2 associated with the two Cisco servers are compatible with each other, but the subset of devices 2 associated with the Avaya server is incompatible with the latter.

The system 1 for managing data relating to the users of a communication system includes a homogenisation server 4 connected to each configuration server 3. This homogenisation server 4 includes a storage means 41 which stores a database including all the data relating to the users of the devices associated with the configuration servers 3.

These data are stored in a homogenised format compatible with the different data models of the different configuration servers. In concrete terms, the database of the homogenisation server uses an abstraction language (typically a mark-up language such as XML or JSON) higher than that of the databases of the configuration servers. The user parameters in this homogenised database are all the parameters used by at least one database of a configuration server 3 (default values being potentially used for the "excess" parameters) so as to be sure that the homogenisation server contains all the information.

The choice of an additional persistent database may seem dangerous for those skilled in the art, in so far as any "discrepancy" between the databases could be a source of errors.

The proposed system provides to this end that the homogenisation server 4 is configured such as to update the database thereof in accordance with every modification of the database of a configuration server 3.

Vice versa, the homogenisation server is configured such as to update the database of at least one configuration server 3 in accordance with every modification of its own database.

Thus each modification of a database is immediately followed by the corresponding modification to the other database, so as to prevent any discrepancy. Moreover, additional mechanisms of verification of integrity, which will be described hereafter, advantageously assure perfect correspondence.

It should be noted that, in general, a modification at the level of the homogenised database leads to the modification of the database of a single configuration server 3, but it is entirely possible that several or even all of the configuration servers are impacted.

The homogenisation server 4 comprises for each of the configuration servers 3, a connector 5 able to make the data stored by the homogenisation server 4 consistent with the data model of the database of the configuration server 3. In other words, this connector (it may be two-way, alternatively it is possible to have two connectors) assures the conversions of data of one database into the format of another. For example, in the case of a change of e-mail address of a user at the level of the homogenisation server 4, the connector 5 "writes" a request for modification of the database of the configuration server 3 in the database of which the address must also be corrected, this request being in a format and a syntax accepted by said configuration server 3.

The homogenisation server 4 further comprises a component 6 (component is taken to mean a software module implemented by the data processing means of the homogenisation server 4) able to generate, from data relating to a user stored in the different databases of the different configuration servers 3, at least one homogenised user profile. Homogenised user profile is taken to mean a profile class at the level of the database of the homogenisation server 4.

It is thus possible to define different types of profile with which are associated specific devices and services. For example, it is possible to define a profile specific to a department or to an extension. This makes it possible to pre-fulfil a certain number of parameters.

As an example, a "premium" profile may as a matter of course have a landline telephone number, a mobile telephone number, an e-mail address, the automatic forwarding of the landline to the mobile and/or to an assistant's extension.

Furthermore, the system 1 for managing data relating to the users of a communication system according to the invention comprises at least one computer device 7 connected to the homogenisation server 4 implementing an interface. This interface allows a user to carry out modifications to the data stored on the homogenisation server 4. Thanks to this user interface, the handling of data is facilitated. Scripts are advantageously incorporated therein so as to automate common tasks such as the movement of a user from one site to another without changing his parameters. Such scripts may potentially concern several configuration servers 3 incompatible with each other, by dividing up the tasks.

A first example is the "moving location" script. This script makes it possible with one click to manage the movement of a team (or even a complete site) from one location to another. This script begins with the modification at the level of their homogenised profiles (stored on the homogenisation server 4) of one or more fields relating to the localisation of the users concerned. This modification leads to, via the persistence mechanism, on the one hand the writing of data relating to the users concerned on the configuration server 3 of the place of destination, and on the other hand the deletion of the corresponding data on the configuration server 3 of the starting place.

A second example is a "crisis management" script. This script makes it possible with one click to re-switch alternately calls to a given number (in particular a "toll-free number") to the extensions of a certain number of users designated to answer calls of the public to this number. This script dynamically modifies the homogenised information items relating to these users designated in order that calls to the given number are redirected to their extension.

A method for updating data relating to a user implemented by this communication system may be the following.

This method comprises the aforementioned two steps of successive updating of two levels of databases:
  modifications of the user data stored in a database of the homogenisation server 4, said homogenisation server being connected to each configuration server 3;
  updating by data processing means of the homogenisation server 4 of the database of the configuration server(s) 3 on which are stored said data relating to said user, in accordance with the modifications of the database of the homogenisation server 4.

In other words, an administrator carries out initially modifications of the user data stored in the database of the homogenisation server 4, and consequently, the homogenisation server 4 updates the database of the configuration servers 3 in accordance with the modifications of the database thereof.

A step of making the data stored by the homogenisation server 4 consistent with the data model of the database of the configuration server 3 may be necessary before updating the database of the configuration servers 3 in accordance with the modifications of the database of the homogenisation server 4.

The method may further include a step of generating, from data relating to a user stored in the different databases of the different configuration servers 3, a homogenised user profile.

The taking into consideration of several heterogeneous sources during the generation of a homogenised user profile may induce, in the event of error, the appearance of a conflict due to a contradiction at the level of the information items supplied.

This is why it is judicious to execute regularly a procedure of verification of the consistency of user data stored on the homogenisation server 4 and the configuration servers 3.

This verification mechanism, mentioned previously, consists in a comparison of the bases so as to pinpoint potential contradictions. In a particularly advanced embodiment, it is implemented following every modification, to ensure that everything has taken place correctly. Alternatively, this verification procedure may be carried out periodically or be triggered by an administrator.

Several modes of implementing this verification procedure are thus possible. Advantageously, according to a "safe mode", a first and a second timer are launched following the step of verification of the consistency of user data, the second timer being longer than the first timer.

At the end of the first timer (of a length for example of two minutes) a re-launch of this step of verification of the consistency of user data is suggested to the user. If he does not respond to this suggestion, the second timer (of a length for example of ten minutes) continues to unwind. At the end of said timer, the re-launch of this step of verification of the consistency of user data is implemented as a matter of course. The timer unwinds here as long as a user is in the course of handling data. Once it cuts the management interface described previously (no modification can then occur), the verifications are no longer necessary.

In the event of discovery of an anomaly during the step of verification of the consistency of user data (i.e. a difference between the databases), a step of rectification of the user data is then implemented. Two principal modes are then possible: the "master" mode, in which the status of the homogenisation server 4 is imposed (it is assumed that the error is at the level of the databases of the configuration servers 3) and the "slave" mode in which the status of the configuration servers 3 is imposed (it is assumed that the error is at the level of the database of the homogenisation server 4). In an "intermediate" mode, it is proposed to the user at each rectification to choose between these two master or slave modes.

As already indicated, the homogenisation server 4 of a system 1 for managing data relating to the users of a communication system is connected to at least one configuration server 3 of the management system 1, said homogenisation server 4 including a storage means on which is stored a database including in a homogenised format all the data relating to the users of devices 2 associated with the configuration servers 3, the homogenisation server 4 including data processing means configured such as to update the database thereof in accordance with every modification of a database of a configuration server 3 and to update the database of at least one configuration server 3 in accordance with every modification of the database of the homogenisation server 4.

The invention claimed is:

1. System for managing data relating to the users of a communication system, said communication system including a plurality of interconnected communication devices and at least one configuration server, each configuration server being associated with a compatible subset of said plurality of communication devices, at least two subsets being such that the configuration server of one is incompatible with devices associated with the configuration server of the other, and each configuration server including a memory which stores a database relating to the users of the devices associated with said configuration server,
  wherein the system further includes a homogenisation server connected to each configuration server, the homogenisation server including a memory which stores a database including all the data relating to the users of the devices associated with the configuration servers in a homogenised format, the homogenisation server including a data processor configured such as to update the database thereof in accordance with every modification of the database of a configuration server and to update the database of at least one configuration server in accordance with every modification of the database of the homogenisation server, so that all the data relating to users is present in duplicate in the system, once in the database of one of the configuration servers, and once in the database of the homogenisation server, wherein the data relating to the users of the devices associated with the configuration servers is split between the database relating to the users of the devices associated with said configuration server and the database including all the data relating to the users of the devices associated with the configuration servers in the homogenised format.

2. System according to claim 1, wherein the homogenisation server comprises, for each of the configuration servers, a connector assuring the conversion of data stored by the homogenisation server in the data format of the database of the configuration server and/or the conversion of data stored by the configuration server in the data format of the database of the homogenisation server.

3. System according to claim 1, wherein the homogenisation server further comprises a component able to generate, from data relating to a user stored in the different databases of the different configuration servers, at least one homogenised user profile.

4. System according to claim 1, comprising at least one computer device connected to the homogenisation server for the implementation of an interface allowing a user to carry out modifications to the data stored on the homogenisation server.

5. Method for updating data relating to a user of a communication system including a plurality of interconnected communication devices and at least one configuration server, each configuration server being associated with a compatible subset of said plurality of communication devices, at least two subsets being such that the configuration server of one is incompatible with the devices associated with the configuration server of the other, and each configuration server including a memory which stores a database relating to the users of the devices associated with said configuration server, wherein the method comprises the following steps:
modifications of the user data stored in a database of a homogenisation server, said homogenisation server being connected to each configuration server;
updating by a data processor of the homogenisation server the database of the configuration server(s) on which are stored said data relating to said user, in accordance with the modifications of the data of the homogenisation server, and updating by the data processor of the homogenisation server the database thereof in accordance with every modification of the database of a configuration server, so that all the data relating to users is present in duplicate in the system, once in the database of one of the configuration servers, and once in the database of the homogenisation server,
wherein the data relating to the users of the devices associated with the configuration servers is split between the database relating to the users of the devices associated with said configuration server and the database including all the data relating to the users of the devices associated with the configuration servers in the homogenised format.

6. Method according to claim 5, wherein the step of updating the database of the configuration server(s) on which are stored said data relating to said user includes making the data stored by the homogenisation server consistent with the data model of the database of the configuration server.

7. Method according to one of claim 5 or 6, further comprising a step of verification of the consistency of the user data stored on the homogenisation server and the configuration servers.

8. Method according to claim 7, wherein a first timer is launched following the step of verification of the consistency of the user data, a re-launch of this step of verification of the consistency of the user data being suggested to the user at the end of the first timer.

9. Method according to claim 8, wherein a second timer is launched following the step of verification of the consistency of the user data, the second timer being longer than the first timer, a re-launch of this step of verification of the consistency of the user data being implemented as a matter of course at the end of the second timer.

10. Method according to claim 7, wherein, in the event of discovery of an anomaly during the step of verification of the consistency of the user data, a step of rectification of the user data is implemented during which either the status of the databases of the configuration servers, or the status of the database of the homogenisation server is imposed.

11. Homogenisation server of a system for managing data relating to the users of a communication system, the homogenisation server comprising a data processor and a memory, and being connected to at least one configuration server of the management system, wherein the memory stores a database including in a homogenised format all of the data relating to the users of the devices associated with the configuration servers,
wherein the data processor is configured such as to update the database thereof in accordance with every modification of a database of a configuration server and to update the database of at least one configuration server in accordance with every modification of the database of the homogenisation server so that all the data relating to users is present in duplicate in the system, once in the database of one of the configuration servers, and once in the database of the homogenisation server,
wherein the data relating to the users of the devices associated with the configuration servers is split between the database relating to the users of the devices associated with said configuration server and the database including all the data relating to the users of the devices associated with the configuration servers in the homogenised format.

* * * * *